US006892905B2

(12) United States Patent
Cousseau

(10) Patent No.: US 6,892,905 B2
(45) Date of Patent: May 17, 2005

(54) DEVICE FOR MEASURING DOSES OF LIQUID PRODUCTS CONTAINED IN FLASKS OR THE LIKE

(75) Inventor: Pierre Cousseau, Chevigny Saint Sauveur (FR)

(73) Assignee: Manufacture Bourguignonne de Plastiques, Sennecey les Dijon (FR)

( * ) Notice: Subject to any disclaimer, the term of this patent is extended or adjusted under 35 U.S.C. 154(b) by 44 days.

(21) Appl. No.: 10/182,999

(22) PCT Filed: Feb. 2, 2001

(86) PCT No.: PCT/FR01/00312

§ 371 (c)(1),
(2), (4) Date: Dec. 3, 2002

(87) PCT Pub. No.: WO01/57479

PCT Pub. Date: Aug. 9, 2001

(65) Prior Publication Data

US 2003/0136187 A1 Jul. 24, 2003

(30) Foreign Application Priority Data

Feb. 3, 2000 (FR) .......................................... 00 01831

(51) Int. Cl.⁷ ................................................ G01F 11/28
(52) U.S. Cl. ........................ 222/438; 222/442; 222/454
(58) Field of Search ................................. 222/438, 454, 222/455, 456, 457, 424, 426, 424.5, 478, 482, 442

(56) References Cited

U.S. PATENT DOCUMENTS

| 2,664,228 A | * | 12/1953 | Radeloff et al. ............. 222/455 |
| 3,023,937 A | * | 3/1962 | Matter ......................... 222/440 |
| 3,288,335 A | * | 11/1966 | Heinz, et al. ................ 222/455 |
| 4,061,253 A | * | 12/1977 | Rockefeller ................. 222/442 |
| 4,614,285 A | * | 9/1986 | Fudalla et al. ............... 222/454 |
| 5,129,561 A | * | 7/1992 | Drobish ....................... 222/455 |
| 5,143,261 A | * | 9/1992 | Drobish ....................... 222/129 |

FOREIGN PATENT DOCUMENTS

| FR | 1 026 309 A | 4/1953 |
| FR | 1 047 119 A | 12/1953 |
| GB | 2 236 094 A | 3/1991 |
| WO | WO 91 09285 A | 6/1991 |

* cited by examiner

Primary Examiner—Frederick Nicolas
(74) Attorney, Agent, or Firm—Young & Thompson

(57) ABSTRACT

A dose-measuring device designed to be inserted in the neck of a flask (1) includes a first metering compartment (A) and a second reserve compartment (B) communicating with the outlet of the measuring device and the metering compartment (A). The device also includes an outer tubular element (5) nested in the neck (2a) of the flask (1), closed at its lower end and open at its upper end and an inner tubular element (5) nested sealed in the outer tubular element (5), including an intermediate body (16), delimiting inwards, the metering compartment and a lower part forming a transfer conduit (23) extending downwards emerging into the metering compartment (A) and in the reserve compartment (B).

8 Claims, 4 Drawing Sheets

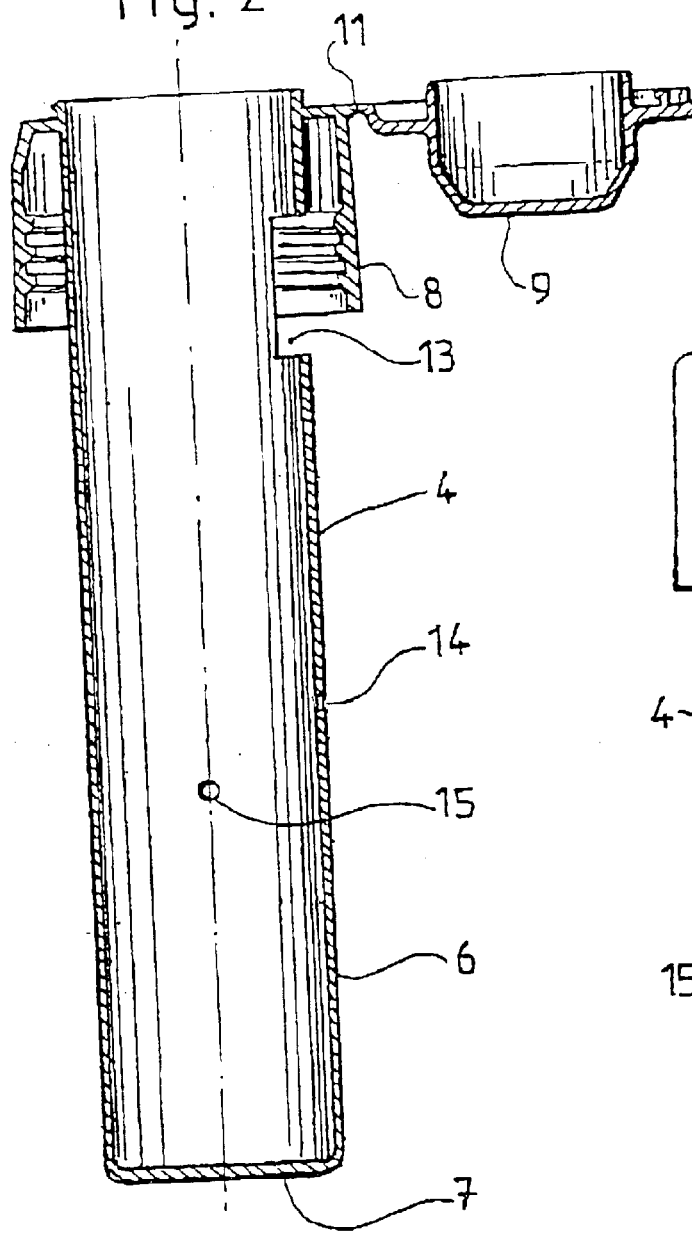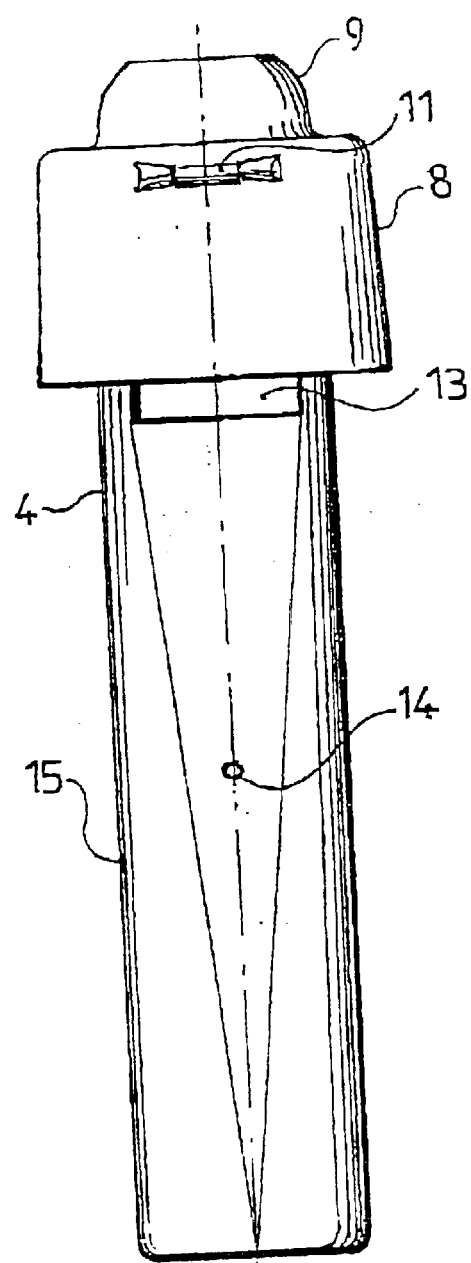

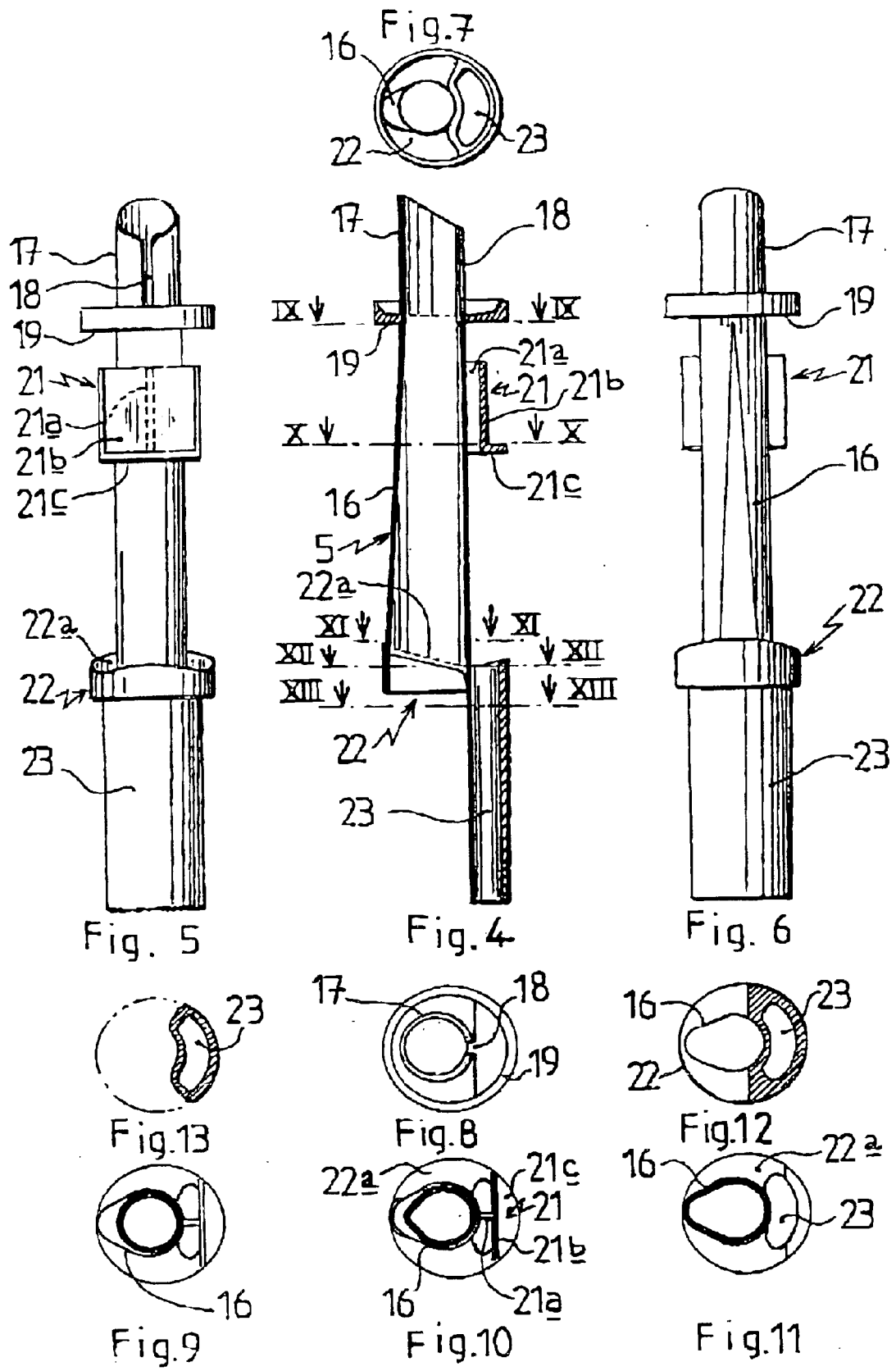

DEVICE FOR MEASURING DOSES OF LIQUID PRODUCTS CONTAINED IN FLASKS OR THE LIKE

BACKGROUND OF THE INVENTION

The present invention relates to a dose-measuring device intended to be inserted in the neck of a flask or like recipient containing a liquid.

Liquid dose-measuring devices are already known, engaged in the neck of a flask, comprising two compartments, namely a first metering compartment filling with a predetermined volume of liquid when the flask is upturned from its normal vertical position and a second reserve compartment communicating with the metering compartment so as to receive the predetermined volume of liquid contained in the metering compartment when the flask is returned into normal vertical position. The reserve compartment communicates, furthermore, with an outlet orifice of the dose-measuring device so as to pour to the outside the dose of liquid contained in the reserve compartment, when the flask is being upturned. Such a device is described for example in Patent FR 1 047 119. This Patent describes a dose-measuring stopper constituted by a tubular armature with a sectioned upper part forming outer stopper and a lower part obturated by a sliding stopper; an inner partitioning divides the armature into two chambers, a filling chamber and a reserve chamber. The armature (comprises a filling orifice and an air evacuation orifice made in the walls of the filling chamber. By upturning the bottle, the liquid may then penetrate in the filling orifice in the corresponding chamber up to the height of the air evacuation orifice which is the point of equilibrium of the pressures: at that moment, if the bottle is straightened up, the liquid pours in the reserve chamber and the volume of liquid contained in the filling chamber being greeter than that of the reserve chamber, the surplus is evacuated via the air evacuation orifice ensuring dose-measuring The operator, by inclining the bottle, then empties the contents of the dose-measuring device, which restarts a fresh dose-measuring and the excess liquid which had remained in the filling chamber mixes again with the new supply. It is easily seen that, with this device, the evacuation of the excess liquid which is ensured via the air evacuation orifice, defines, in fact, the level of filling of each chamber; in this way, the limits of filling are identical when one begins to upturn the recipient to empty the dose-measuring chamber, with the result that a part of the liquid may then overflow from the reserve chamber towards the filling chamber incontestably creating an imprecision of the dose-measurement since the quantity of liquid that may overflow from this same filling chamber varies depending on whether the recipient is inclined in a plane more or less close to the plane of symmetry of the stopper.

SUMMARY OF THE INVENTION

The present invention relates to an improvement made to the earlier device, with a view to improving the precision of the dose-measurement of liquid.

To that end, this dose-measuring device intended to be inserted in the neck of a flask or like recipient containing a liquid comprising two compartments, namely a first metering compartment filling with a predetermined volume of liquid when the flask is upturned from its normal vertical position, and a second reserve compartment communicating with the metering compartment communicating with the outlet orifice of the dose-measuring device and with the metering compartment so as to receive the volume of liquid contained in the latter, when the flask is returned into normal position comprising an outer tubular element fitted in the neck of the flask, closed at its lower end and open at its upper end, presenting, in its lateral wall, an opening for filling close to its upper end and opening out in the metering compartment, a first air evacuation orifice (14), defining the level of filling of the compartment being provided in the wall of the end tubular element (4) and an inner tubular element (5) nested in sealed manner in the outer tubular element (4), comprising an upper end part forming a pourer (17), an intermediate body (16) defining, towards the inside, the metering compartment (A) and a lower end part forming a transfer conduit (23) extending downwardly, opening out, at its upper end, in the metering compartment (A) and, at its lower end, in the reserve compartment (B) is, according to the principal characteristic of the invention, noteworthy in that said outer tubular element (4) comprises a second overflow orifice (15) located at a level lower than that of the air evacuation orifice (14), i.e. closer to the bottom of the outer tubular element (4), and defining the maximum level of filling of the reserve compartment (B).

It will be readily understood that the dose-measuring orifice, i.e. the overflow orifice, precisely defines the maximum level of filling of the metering compartment; in effect, the two compartments being separated and, insofar as the dose-mesuring compartment is only partially filled, the liquid can thus not overflow towards the filling chamber i.e. towards the reserve compartment, when the recipient is upturned; there is therefore no return of the liquid towards the first compartment, whether the recipient is inclined in the plane of symmetry of the stopper or not, this procuring the desired precision of dose-measuring.

BRIEF DESCRIPTION OF THE DRAWINGS

A form of embodiment of the present invention will be described hereinafter by way of non-limiting example, with reference to the accompanying drawings, in which:

FIG. 2 is a view in axial section of the inner tubular element with its obturator in open position.

FIG. 3 is a side view of the inner tubular element shown in FIG. 2, its obturator being in closed position.

FIG. 4 is a view in axial section of the inner tubular element

FIG. 5 is a side view of the inner tubular element, taken from the right in FIG. 4.

FIG. 6 is a side view of the inner tubular element, taken from the left in FIG. 4.

FIG. 7 is a view from underneath of the inner tubular element.

FIG. 8 is a view from above of the inner tubular element.

FIG. 9 is a view in cross-section taken along line IX—IX of FIG. 4.

FIG. 10 is a view in cross-section taken along line X—X of FIG. 4.

FIG. 11 is a view in cross-section taken along line XI—XI of FIG. 4.

FIG. 12 is a view in cross-section taken along line XII—XII of FIG. 4.

FIG. 13 is a view in cross-section taken along line XIII—XIII of FIG. 4.

DESCRIPTION OF THE PREFERRED EMBODIMENTS

Figure 1:
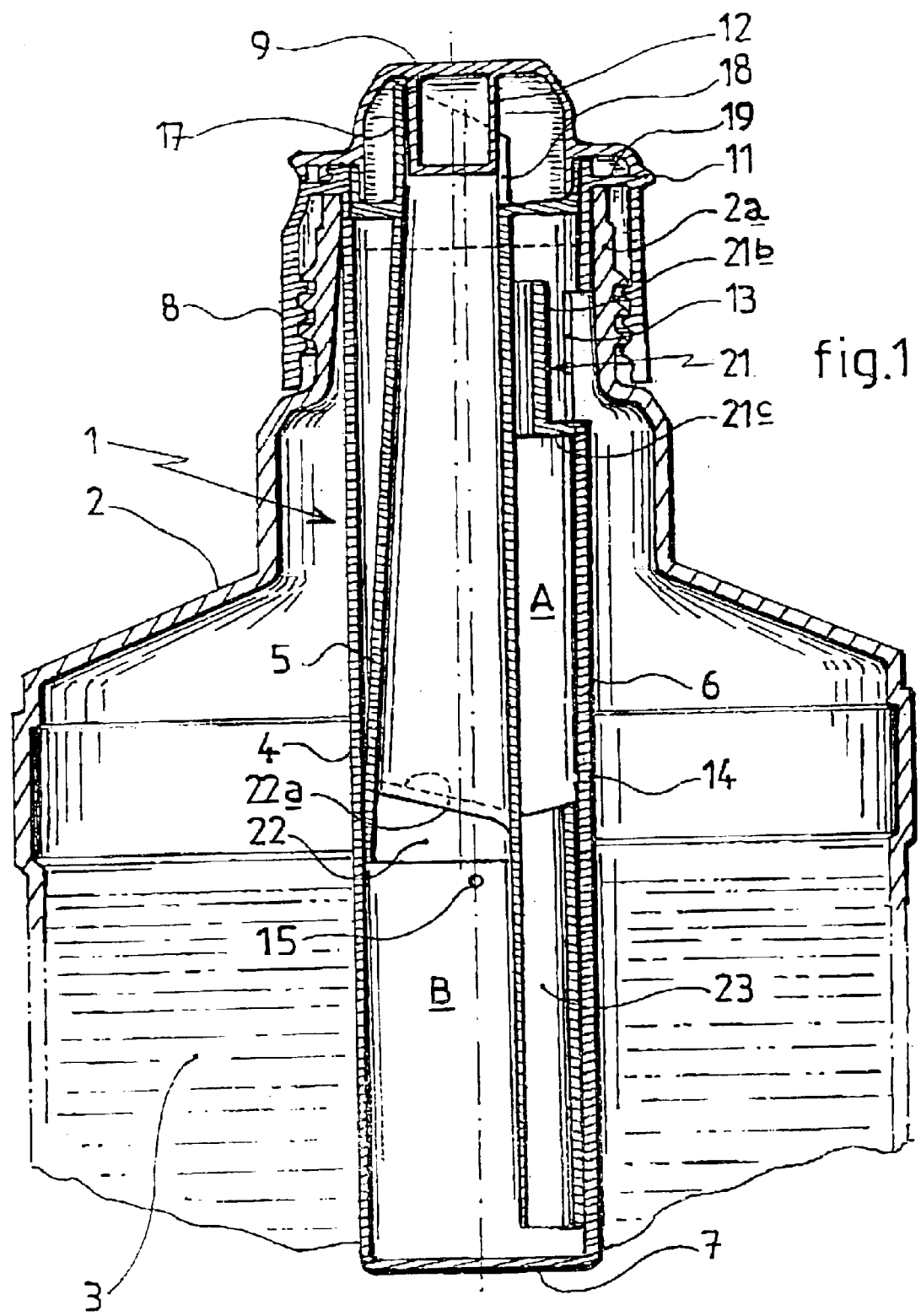
FIG. 1 is a view in axial and vertical section of a dose measuring device according to the invention, engaged in the neck of a flask containing a liquid having to be distributed in predetermined doses.

In FIG. 1, the dose-measuring device according to the invention, generally designated by reference 1, is engaged in sealed manner in the neck 2a of a flask 2 containing a liquid 3. It is fixed to the neck of the flask 2 by any appropriate means, for example by screwing with non-return, as shown in FIG. 1, or by clipping. The dose-measuring device comprises, like the devices known previously, a first metering compartment A, in its upper part, in normal position of the flask, and a second reserve compartment B, in its lower part, these compartments being defined as specified hereinbelow.

According to the invention, the dose-measuring device 1 is constituted by two tubular elements fitted axially in each other, namely an outer tubular element 4 and an inner tubular element 5. These two elements are advantageously made of moulded plastics material.

The outer tubular element 4, shown in greater detail in FIGS. 2 and 3, comprises a cylindrical body 6 closed, at its lower end, by a bottom 7 and open at its upper end. The outer diameter of the cylindrical body 6 is substantially equal to the inner diameter of the neck 2a of the flask 2. The cylindrical body 6 is fast, in its upper part, with a coaxial skirt 8 intended to cover, on the outside, the neck 2a of the flask 2 which is fixed to the neck of the flask by screwing with non-return, in manner known per se. The skirt 8 bears an obturator 9 pivoting about a lateral hinge 11 ensuring its join with the skirt 8 so as to be able to close the upper orifice of the cylindrical body 6. The obturator 9 may advantageously comprise a projecting part forming stopper 12 (FIG. 1) to ensure a sealed closure of the upper end of the inner tubular element 5 as will be specified hereinafter. Furthermore, the cylindrical body 6 presents in its wall near the upper orifice an opening 13 intended to constitute the orifice for filling the metering compartment A. The cylindrical body 6 likewise presents, in an intermediate part of its wall, an orifice 14 for evacuation of the air, and, slightly below the latter, another orifice 15, as may be seen in FIG. 1. The role of these orifices will be specified in the following description.

There will now be described, with reference to FIGS. 4 to 13, the structure of the inner tubular element 5. This element 5 comprises an intermediate tubular body 16, with upwardly decreasing curved cross-section and of which the upper end is extended by a cylindrical part 17 forming pourer. This pourer 17 has an orifice inclined with respect to the longitudinal axis and it presents a longitudinal slot 18. A cylindrical transverse skirt 19 is provided in the zone of junction of the intermediate body 16 and of the cylindrical pourer 17. This transverse skirt 19 presents a cylindrical lateral wall having an outer diameter substantially equal to the inner diameter of the upper end part of the outer tubular element 4 so as to be able to fit closely therein, in sealed manner, as is shown in FIG. 1.

Below the skirt 19, the intermediate tubular body 16 bears an element forming flow deviator 21 with T-shaped cross-section, as shown in FIG. 10, element of which the vertical web 21a is attached to the intermediate tubular body 16. Furthermore, the flow deviator element 21 comprises a vertical planar plate 21b, corresponding to the head of the T-shaped cross-section, of which the lower end is connected to a horizontal flange 21c, extending outwardly, in the form of a segment of circle of which the radius of curvature is equal to the radius of the inner surface of the outer tubular element 4, so as to be closely applied against the wall of this element when the two tubular elements 4 and 5 are fitted in each other.

At its lower end, the intermediate tubular body 16 is extended by a cylindrical skirt 22 of which the outer diameter is substantially equal to the inner diameter of the outer tubular element 4, in order to ensure seal therebetween. This skirt 22 comprises a downwardly extending cylindrical lateral wall and an upper wall 22a.

Furthermore, the intermediate tubular body 16 is extended downwardly by a vertical transfer conduit 23, open at its two ends, which extends downwardly up to the vicinity of the bottom of the outer tubular element 4. This transfer conduit 23 is vertically aligned with the flow deviator element 21. Its upper orifice is located at the level of the lower end of the upper wall 22a of the skirt 22 which is advantageously inclined in the direction of the upper orifice of the transfer conduit 23. The cross-section of the transfer conduit 23 is, for example in the form of a "bean" and its outer surface is cylindrical with a radius of curvature equal to that of the inner surface of the outer tubular element 4.

The dose-measuring device 1 according to the invention, constituted by the two tubular elements 4, 5 fitted in each other, is thus as shown in FIG. 1. In this fitted position, the upper skirt 19 of the inner tubular element 5 is fitted closely, in sealed manner, in the upper end part of the outer tubular element 4. The flow deviator element 21 extends opposite the opening 13, from the lower end thereof and preferably its upper end is located just a little beyond the upper end of the opening 13. The lower flange 21c, in the form of a segment of circle, of the flow deviator element 21 is in sealed contact, along an arc of circle, with the wall of the cylindrical body 6, just below the lower end of the opening 13, and the vertical planar part 21b of the deviator element 21 is in contact, along its two vertical edges, with the inner surface of the outer tubular element 4. The cylindrical body 6 defines, towards the inside, the metering compartment A which is also delimited, towards the outside by the cylindrical wall of the outer tubular element 4. The air evacuation orifice 14 of the cylindrical body 6 is located just above the upper orifice of the transfer conduit 23 and the overflow evacuation orifice 15 is located just below the lower horizontal edge of the skirt 22 of which the cylindrical lateral wall is applied in sealed manner against the inner surface of the outer tubular element 4.

According to a particularly advantageous configuration, the first air evacuation orifice 14 of the cylindrical body 6 is diametrally opposite the pourer 17 and the second overflow evacuation orifice 15 is substantially at 90° with respect to the first orifice 14 in order that the dose initially contained in the reserve compartment B flows without losses.

Finally, the curved outer surface of the transfer conduit 23 is closely applied against the inner surface of the cylindrical body 6 and its lower orifice located at a short distance from the bottom of the outer tubular element 4.

The metering compartment A, which is in upper position when the flask is in its normal position, is defined between the upper skirt 19 of the inner tubular element 5 and the air evacuation orifice 14. As for the reserve compartment B, it is defined between the bottom of the outer tubular element 4 and the overflow orifice 15.

The functioning of the dose-measuring device 1 according to the invention will now be explained with reference to FIGS. 1, 14 and 15.

In FIG. 1, the flask 2 is shown before its first use and, in that case, the liquid 3 is located totally outside the dose-measuring device 1. Upon first use, the flask 2 is upturned through 180°, to take it in the position shown in FIG. 15 and the liquid 3 contained in the flask in that case flows towards the inside of the metering compartment A, passing through the opening constituting the filling orifice 13, being deviated downwardly i.e. towards the upper skirt 19 by the flow deviator element 21, and skirting the latter as indicated by the arrows. The air contained in the upper part of the compartment A, escapes to the outside, through the evacuation orifice 14. Filling takes place until the level of the liquid in the metering compartment A arrives substantially at the level of the air evacuation orirfice 14. During this first use, no liquid leaves the dose-measuring device since the reserve compartment B is in that case empty.

Figure 14:
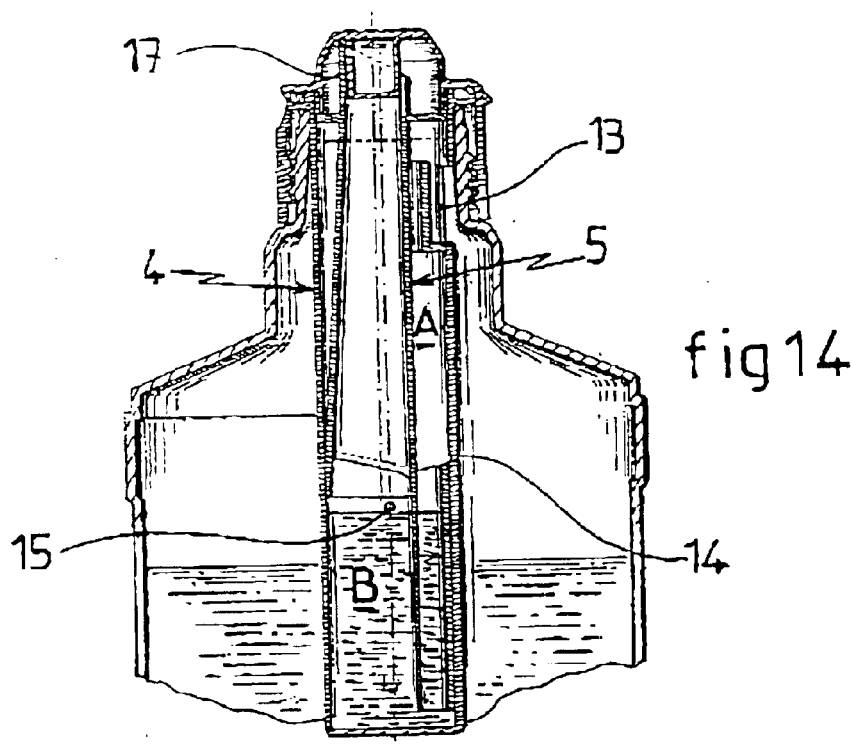
FIG. 14 is a view in vertical section of the dose-measuring device of which the reserve compartment contains a dose of liquid, the flask being in its normal vertical position.

After the metering compartment A is filled, the flask is upturned in order to place it in its normal position as shown in FIG. 14. Subsequent to this return to normal position, the dose of liquid contained in the metering compartment A flows rapidly into the reserve compartment B, passing through the transfer conduit 23. The predetermined dose of liquid which was previously stored in the metering compartment A is thus transferred entirely to the reserve compartment B, i.e. virtually up to the level of the overflow orifice 15. The device is then ready for a first effective use. This first use is effected by upturning the flask, as shown in FIG. 15, and subsequent to this upturning, the dose of liquid contained in the reserve compartment B flows outside, through the inner tubular element 5 and the pourer 17. During this time, the metering compartment A is filled again with the predetermined dose of liquid which will then be transferred to the reserve compartment B when the flask 2 will have been returned into its normal position.

Figure 15:
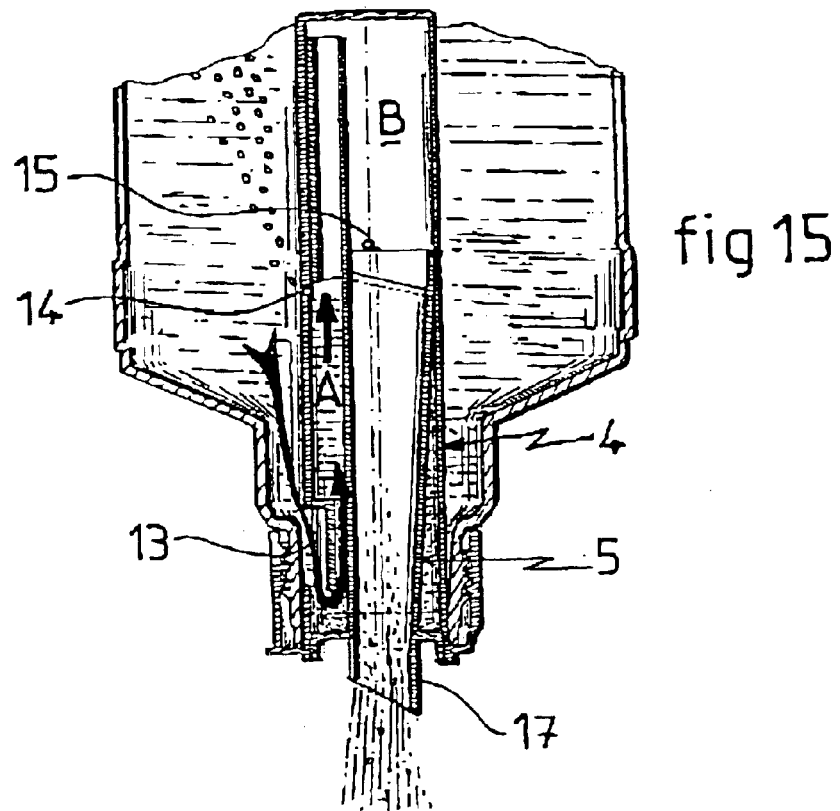
FIG. 15 is a view in vertical section of the dose-measuring device when the flask is upturned, the metering compartment being in the course of being filled and the reserve compartment in the course of being emptied.

It is important to note that the upturning of the flask 2 to take it from its normal vertical position, shown in FIG. 14, up to its position where the metering compartment A in the course of being filled and the reserve compartment B in the course of being emptied, shown in FIG. 15, is advantageously obtained by a rotation thought about 180° in anti-clockwise direction for the filling of the metering compartment A, but especially the emptying of the reserve compartment B, to occur correctly, thus ensuring a better precision of the dose-measuring.

What is claimed is:

1. A dose-measuring device for insertion into a container, the device comprising:

a first metering compartment that is arranged for filling with a predetermined volume of liquid when the device is inserted into a container and the container is upturned from a vertical position; and a second reserve compartment communicating with an outlet orifice of the device and with said first metering compartment so as to receive the volume of the liquid contained in said first metering compartment when the container is returned to the vertical position, said second reserve compartment comprising, an outer tubular element adapted to fit in a neck of the container and that is closed at its lower end and open at its upper end, an opening in a lateral wall of said second reserve compartment close to an upper end thereof and opening to said first metering compartment, a first air evacuation orifice defining a level of filling of said first metering compartment and that is through a wall of said outer tubular element, and an inner tubular element nested in a sealed manner in said outer tubular element, said inner tubular element comprising an upper end part forming a pourer, an intermediate body defining an interior part of said first metering compartment, and a lower end part forming a transfer conduit extending downwardly and opening, at its upper end, in said first metering compartment and, at its lower end, in said second reserve compartment, said intermediate body having, at its lower end, a skirt with a cylindrical lateral wall applied in sealed manner against an inner surface of said outer tubular element, and an upper wall in which is formed said upper end of said transfer conduit.

2. The device of claim 1, wherein said outer tubular element comprises a second overflow orifice located at a level lower than that of said first air evacuation orifice and defining a maximum level of filling of said second reserve compartment.

3. The device of claim 2, wherein said intermediate body comprises a lower edge located above said second overflow orifice.

4. The device according to claim 2, wherein said first air evacuation orifice is diametrically opposite said pourer and wherein said second overflow evacuation orifice is substantially at 90° with respect to said first air evacuation orifice.

5. The device according to claim 4, wherein the skirt is located on the inner tubular element so that, in fitted position, the first air evacuation orifice is located just above an upper wall of the skirt.

6. The device according to claim 5, wherein the upper wall of the skirt is inclined in the direction of the upper orifice of the transfer conduit.

7. The device according to claim 1, wherein the inner tubular element comprises, in its upper end part, an upper skirt of outer diameter substantially equal to the inner diameter of the outer tubular element and applied in sealed manner against the wall of the latter.

8. The device according to claim 7, wherein the intermediate tubular body comprises, below the upper skirt a flow deviation element extending longitudinally so as to deviate the flow of liquid entering in the direction of the upper skirt.

* * * * *